(12) United States Patent
Hughes et al.

(10) Patent No.: US 9,712,463 B1
(45) Date of Patent: Jul. 18, 2017

(54) WORKLOAD OPTIMIZATION IN A WIDE AREA NETWORK UTILIZING VIRTUAL SWITCHES

(71) Applicant: Silver Peak Systems, Inc., Santa Clara, CA (US)

(72) Inventors: David Anthony Hughes, Los Altos Hills, CA (US); Carl Hubbard, Los Altos, CA (US); Hon Tat Ho, Sunnyvale, CA (US); Damon John Ennis, San Jose, CA (US)

(73) Assignee: Silver Peak Systems, Inc., Santa Clara, CA (US)

( * ) Notice: Subject to any disclaimer, the term of this patent is extended or adjusted under 35 U.S.C. 154(b) by 342 days.

(21) Appl. No.: 13/621,534

(22) Filed: Sep. 17, 2012

(51) Int. Cl.
 *H04L 12/931* (2013.01)
 *H04L 12/46* (2006.01)
(52) U.S. Cl.
 CPC .......... *H04L 49/70* (2013.01); *H04L 12/4641* (2013.01)
(58) Field of Classification Search
 None
 See application file for complete search history.

(56) References Cited

U.S. PATENT DOCUMENTS

| | | | |
|---|---|---|---|
| 4,494,108 A | 1/1985 | Langdon, Jr. et al. | |
| 4,558,302 A | 12/1985 | Welch | |
| 4,612,532 A | 9/1986 | Bacon et al. | |
| 5,023,611 A | 6/1991 | Chamzas et al. | |
| 5,243,341 A | 9/1993 | Seroussi et al. | |
| 5,307,413 A | 4/1994 | Denzer | |
| 5,357,250 A | 10/1994 | Healey et al. | |
| 5,359,720 A | 10/1994 | Tamura et al. | |
| 5,373,290 A | 12/1994 | Lempel et al. | |
| 5,483,556 A | 1/1996 | Pillan et al. | |

(Continued)

FOREIGN PATENT DOCUMENTS

| | | |
|---|---|---|
| EP | 1507353 A2 | 2/2005 |
| JP | H05-061964 | 3/1993 |
| WO | WO0135226 A1 | 5/2001 |

OTHER PUBLICATIONS

Knutsson, Bjorn et al., "Transparent Proxy Signalling", Journal of Communications and Networks, vol. 3, No. 2, Jun. 2001.

(Continued)

*Primary Examiner* — Hassan Kizou
*Assistant Examiner* — Roberta A Shand
(74) *Attorney, Agent, or Firm* — Carr & Ferrell LLP

(57) ABSTRACT

Disclosed is a method for data traffic optimization within a virtual environment. The method may be implemented within a data center hosting virtual machines and using virtual switches for routing data traffic. The method includes instructing a virtual switch associated with a virtual machine to redirect one or more data packets directed to or from a first address associated with the virtual machine to a second address associated with data optimization virtual machine, wherein the redirection is based at least in part on an access control list, receiving, at the data optimization virtual machine, the one or more data packets redirected by the virtual switch, selectively performing one or more transformations on the one or more data packets to create one or more transformed data packets, and transmitting the one or more transformed data packets to the first address.

27 Claims, 7 Drawing Sheets

(56) References Cited

U.S. PATENT DOCUMENTS

| | | |
|---|---|---|
| 5,532,693 A | 7/1996 | Winters et al. |
| 5,592,613 A | 1/1997 | Miyazawa et al. |
| 5,611,049 A | 3/1997 | Pitts |
| 5,627,533 A | 5/1997 | Clark |
| 5,635,932 A | 6/1997 | Shinagawa et al. |
| 5,652,581 A | 7/1997 | Furlan et al. |
| 5,659,737 A | 8/1997 | Matsuda |
| 5,675,587 A | 10/1997 | Okuyama et al. |
| 5,710,562 A | 1/1998 | Gormish et al. |
| 5,748,122 A | 5/1998 | Shinagawa et al. |
| 5,754,774 A | 5/1998 | Bittinger et al. |
| 5,802,106 A | 9/1998 | Packer |
| 5,805,822 A | 9/1998 | Long et al. |
| 5,883,891 A | 3/1999 | Williams et al. |
| 5,903,230 A | 5/1999 | Masenas |
| 5,955,976 A | 9/1999 | Heath |
| 6,000,053 A | 12/1999 | Levine et al. |
| 6,003,087 A | 12/1999 | Housel, III et al. |
| 6,054,943 A | 4/2000 | Lawrence |
| 6,081,883 A | 6/2000 | Popelka et al. |
| 6,084,855 A | 7/2000 | Soirinsuo et al. |
| 6,175,944 B1 | 1/2001 | Urbanke et al. |
| 6,191,710 B1 | 2/2001 | Waletzki |
| 6,295,541 B1 | 9/2001 | Bodnar et al. |
| 6,308,148 B1 | 10/2001 | Bruins et al. |
| 6,311,260 B1 | 10/2001 | Stone et al. |
| 6,339,616 B1 | 1/2002 | Kovalev |
| 6,374,266 B1 | 4/2002 | Shnelvar |
| 6,434,641 B1 | 8/2002 | Haupt et al. |
| 6,434,662 B1 | 8/2002 | Greene et al. |
| 6,438,664 B1 | 8/2002 | McGrath et al. |
| 6,452,915 B1 | 9/2002 | Jorgensen |
| 6,463,001 B1 | 10/2002 | Williams |
| 6,489,902 B2 | 12/2002 | Heath |
| 6,493,698 B1 | 12/2002 | Beylin |
| 6,570,511 B1 | 5/2003 | Cooper |
| 6,587,985 B1 | 7/2003 | Fukushima et al. |
| 6,614,368 B1 | 9/2003 | Cooper |
| 6,618,397 B1 | 9/2003 | Huang |
| 6,633,953 B2 | 10/2003 | Stark |
| 6,643,259 B1 | 11/2003 | Borella et al. |
| 6,650,644 B1 | 11/2003 | Colley et al. |
| 6,653,954 B2 | 11/2003 | Rijavec |
| 6,667,700 B1 | 12/2003 | McCanne et al. |
| 6,674,769 B1 | 1/2004 | Viswanath |
| 6,718,361 B1 | 4/2004 | Basani et al. |
| 6,728,840 B1 | 4/2004 | Shatil et al. |
| 6,738,379 B1 | 5/2004 | Balazinski et al. |
| 6,769,048 B2 | 7/2004 | Goldberg et al. |
| 6,791,945 B1 | 9/2004 | Levenson et al. |
| 6,856,651 B2 | 2/2005 | Singh |
| 6,859,842 B1 | 2/2005 | Nakamichi et al. |
| 6,862,602 B2 | 3/2005 | Guha |
| 6,910,106 B2 | 6/2005 | Sechrest et al. |
| 6,963,980 B1 | 11/2005 | Mattsson |
| 6,968,374 B2 | 11/2005 | Lemieux et al. |
| 6,978,384 B1 | 12/2005 | Milliken |
| 7,007,044 B1 | 2/2006 | Rafert et al. |
| 7,020,750 B2 | 3/2006 | Thiyagaranjan et al. |
| 7,035,214 B1 | 4/2006 | Seddigh et al. |
| 7,047,281 B1 | 5/2006 | Kausik |
| 7,069,268 B1 | 6/2006 | Burns et al. |
| 7,069,342 B1 | 6/2006 | Biederman |
| 7,110,407 B1 | 9/2006 | Khanna |
| 7,111,005 B1 | 9/2006 | Wessman |
| 7,113,962 B1 | 9/2006 | Kee et al. |
| 7,120,666 B2 | 10/2006 | McCanne et al. |
| 7,145,889 B1 | 12/2006 | Zhang et al. |
| 7,197,597 B1 | 3/2007 | Scheid et al. |
| 7,200,847 B2 | 4/2007 | Straube et al. |
| 7,215,667 B1 | 5/2007 | Davis |
| 7,242,681 B1 | 7/2007 | Van Bokkelen et al. |
| 7,243,094 B2 | 7/2007 | Tabellion et al. |
| 7,266,645 B2 | 9/2007 | Garg et al. |
| 7,278,016 B1 | 10/2007 | Detrick et al. |
| 7,318,100 B2 | 1/2008 | Demmer et al. |
| 7,366,829 B1 | 4/2008 | Luttrell et al. |
| 7,380,006 B2 | 5/2008 | Srinivas et al. |
| 7,383,329 B2 | 6/2008 | Erickson |
| 7,383,348 B2 | 6/2008 | Seki et al. |
| 7,388,844 B1 | 6/2008 | Brown et al. |
| 7,389,357 B2 | 6/2008 | Duffie, III et al. |
| 7,389,393 B1 | 6/2008 | Karr et al. |
| 7,417,570 B2 | 8/2008 | Srinivasan et al. |
| 7,417,991 B1 | 8/2008 | Crawford et al. |
| 7,420,992 B1 | 9/2008 | Fang et al. |
| 7,428,573 B2 | 9/2008 | McCanne et al. |
| 7,451,237 B2 | 11/2008 | Takekawa et al. |
| 7,453,379 B2 | 11/2008 | Plamondon |
| 7,454,443 B2 | 11/2008 | Ram et al. |
| 7,457,315 B1 | 11/2008 | Smith |
| 7,460,473 B1 | 12/2008 | Kodama et al. |
| 7,471,629 B2 | 12/2008 | Melpignano |
| 7,532,134 B2 | 5/2009 | Samuels et al. |
| 7,555,484 B2 | 6/2009 | Kulkarni et al. |
| 7,571,343 B1 | 8/2009 | Xiang et al. |
| 7,571,344 B2 | 8/2009 | Hughes et al. |
| 7,587,401 B2 | 9/2009 | Yeo et al. |
| 7,596,802 B2 | 9/2009 | Border et al. |
| 7,619,545 B2 | 11/2009 | Samuels et al. |
| 7,620,870 B2 | 11/2009 | Srinivasan et al. |
| 7,624,446 B1 | 11/2009 | Wilhelm |
| 7,630,295 B2 | 12/2009 | Hughes et al. |
| 7,639,700 B1 | 12/2009 | Nabhan et al. |
| 7,643,426 B1 | 1/2010 | Lee et al. |
| 7,644,230 B1 | 1/2010 | Hughes et al. |
| 7,676,554 B1 | 3/2010 | Malmskog et al. |
| 7,698,431 B1 | 4/2010 | Hughes |
| 7,702,843 B1 | 4/2010 | Chen et al. |
| 7,714,747 B2 | 5/2010 | Fallon |
| 7,746,781 B1 | 6/2010 | Xiang |
| 7,764,606 B1 | 7/2010 | Ferguson et al. |
| 7,810,155 B1 | 10/2010 | Ravi |
| 7,827,237 B2 | 11/2010 | Plamondon |
| 7,849,134 B2 | 12/2010 | McCanne et al. |
| 7,853,699 B2 | 12/2010 | Wu et al. |
| 7,873,786 B1 | 1/2011 | Singh et al. |
| 7,917,599 B1 | 3/2011 | Gopalan et al. |
| 7,925,711 B1 | 4/2011 | Gopalan et al. |
| 7,941,606 B1 | 5/2011 | Pullela et al. |
| 7,945,736 B2 | 5/2011 | Hughes et al. |
| 7,948,921 B1 | 5/2011 | Hughes et al. |
| 7,953,869 B2 | 5/2011 | Demmer et al. |
| 7,970,898 B2 | 6/2011 | Clubb et al. |
| 7,975,018 B2 | 7/2011 | Unrau et al. |
| 8,069,225 B2 | 11/2011 | McCanne et al. |
| 8,072,985 B2 | 12/2011 | Golan et al. |
| 8,090,027 B2 | 1/2012 | Schneider |
| 8,095,774 B1 | 1/2012 | Hughes et al. |
| 8,140,757 B1 | 3/2012 | Singh et al. |
| 8,171,238 B1 | 5/2012 | Hughes et al. |
| 8,209,334 B1 | 6/2012 | Doerner |
| 8,225,072 B2 | 7/2012 | Hughes et al. |
| 8,271,325 B2 | 9/2012 | Silverman et al. |
| 8,307,115 B1 | 11/2012 | Hughes |
| 8,312,226 B2 | 11/2012 | Hughes |
| 8,352,608 B1 * | 1/2013 | Keagy et al. ................ 709/226 |
| 8,370,583 B2 | 2/2013 | Hughes |
| 8,386,797 B1 | 2/2013 | Danilak |
| 8,392,684 B2 | 3/2013 | Hughes |
| 8,442,052 B1 | 5/2013 | Hughes |
| 8,447,740 B1 | 5/2013 | Huang et al. |
| 8,473,714 B2 | 6/2013 | Hughes et al. |
| 8,489,562 B1 | 7/2013 | Hughes et al. |
| 8,516,158 B1 | 8/2013 | Wu et al. |
| 8,565,118 B2 * | 10/2013 | Shukla et al. ................ 370/254 |
| 8,595,314 B1 | 11/2013 | Hughes |
| 8,613,071 B2 | 12/2013 | Day et al. |
| 8,681,614 B1 | 3/2014 | McCanne et al. |
| 8,699,490 B2 | 4/2014 | Zheng et al. |
| 8,700,771 B1 | 4/2014 | Ramankutty et al. |
| 8,706,947 B1 | 4/2014 | Vincent |
| 8,725,988 B2 | 5/2014 | Hughes et al. |
| 8,732,423 B1 | 5/2014 | Hughes |

(56) References Cited

U.S. PATENT DOCUMENTS

| | | |
|---|---|---|
| 8,738,865 B1 | 5/2014 | Hughes et al. |
| 8,743,683 B1 | 6/2014 | Hughes |
| 8,755,381 B2 | 6/2014 | Hughes et al. |
| 8,811,431 B2 | 8/2014 | Hughes |
| 8,885,632 B2 | 11/2014 | Hughes et al. |
| 8,929,380 B1 | 1/2015 | Hughes et al. |
| 8,929,402 B1 | 1/2015 | Hughes |
| 8,930,650 B1 | 1/2015 | Hughes et al. |
| 9,003,541 B1 | 4/2015 | Patidar |
| 9,036,662 B1 | 5/2015 | Hughes |
| 9,054,876 B1 | 6/2015 | Yagnik |
| 9,092,342 B2 | 7/2015 | Hughes et al. |
| 9,130,991 B2 | 9/2015 | Hughes |
| 9,143,455 B1 | 9/2015 | Hughes |
| 9,152,574 B2 | 10/2015 | Hughes et al. |
| 9,191,342 B2 | 11/2015 | Hughes et al. |
| 9,253,277 B2 | 2/2016 | Hughes et al. |
| 9,306,818 B2 | 4/2016 | Aumann et al. |
| 9,307,442 B2 | 4/2016 | Bachmann et al. |
| 9,363,309 B2 | 6/2016 | Hughes |
| 9,397,951 B1 | 7/2016 | Hughes |
| 9,438,538 B2 | 9/2016 | Hughes et al. |
| 9,549,048 B1 | 1/2017 | Hughes |
| 9,584,403 B2 | 2/2017 | Hughes et al. |
| 9,584,414 B2 | 2/2017 | Sung et al. |
| 9,613,071 B1 | 4/2017 | Hughes |
| 9,626,224 B2 | 4/2017 | Hughes et al. |
| 2001/0026231 A1 | 10/2001 | Satoh |
| 2001/0054084 A1 | 12/2001 | Kosmynin |
| 2002/0007413 A1 | 1/2002 | Garcia-Luna-Aceves et al. |
| 2002/0010702 A1 | 1/2002 | Ajtai et al. |
| 2002/0040475 A1 | 4/2002 | Yap et al. |
| 2002/0061027 A1 | 5/2002 | Abiru et al. |
| 2002/0065998 A1 | 5/2002 | Buckland |
| 2002/0071436 A1 | 6/2002 | Border et al. |
| 2002/0078242 A1 | 6/2002 | Viswanath |
| 2002/0101822 A1 | 8/2002 | Ayyagari et al. |
| 2002/0107988 A1 | 8/2002 | Jordan |
| 2002/0116424 A1 | 8/2002 | Radermacher et al. |
| 2002/0129158 A1 | 9/2002 | Zhang et al. |
| 2002/0129260 A1 | 9/2002 | Benfield et al. |
| 2002/0131434 A1 | 9/2002 | Vukovic et al. |
| 2002/0150041 A1 | 10/2002 | Reinshmidt et al. |
| 2002/0163911 A1 | 11/2002 | Wee et al. |
| 2002/0169818 A1 | 11/2002 | Stewart et al. |
| 2002/0181494 A1 | 12/2002 | Rhee |
| 2002/0188871 A1 | 12/2002 | Noehring et al. |
| 2002/0194324 A1 | 12/2002 | Guha |
| 2003/0002664 A1 | 1/2003 | Anand |
| 2003/0009558 A1 | 1/2003 | Ben-Yehezkel |
| 2003/0012400 A1 | 1/2003 | McAuliffe et al. |
| 2003/0046572 A1 | 3/2003 | Newman et al. |
| 2003/0123481 A1 | 7/2003 | Neale et al. |
| 2003/0123671 A1 | 7/2003 | He et al. |
| 2003/0131079 A1 | 7/2003 | Neale et al. |
| 2003/0133568 A1 | 7/2003 | Stein et al. |
| 2003/0142658 A1 | 7/2003 | Ofuji et al. |
| 2003/0149661 A1 | 8/2003 | Mitchell et al. |
| 2003/0149869 A1 | 8/2003 | Gleichauf |
| 2003/0204619 A1 | 10/2003 | Bays |
| 2003/0214502 A1 | 11/2003 | Park et al. |
| 2003/0214954 A1 | 11/2003 | Oldak et al. |
| 2003/0233431 A1 | 12/2003 | Reddy et al. |
| 2004/0008711 A1 | 1/2004 | Lahti et al. |
| 2004/0047308 A1 | 3/2004 | Kavanagh et al. |
| 2004/0083299 A1 | 4/2004 | Dietz et al. |
| 2004/0086114 A1 | 5/2004 | Rarick |
| 2004/0088376 A1 | 5/2004 | McCanne et al. |
| 2004/0114569 A1 | 6/2004 | Naden et al. |
| 2004/0117571 A1 | 6/2004 | Chang et al. |
| 2004/0123139 A1 | 6/2004 | Aiello et al. |
| 2004/0158644 A1 | 8/2004 | Albuquerque et al. |
| 2004/0179542 A1 | 9/2004 | Murakami et al. |
| 2004/0181679 A1 | 9/2004 | Dettinger et al. |
| 2004/0199771 A1 | 10/2004 | Morten et al. |
| 2004/0202110 A1 | 10/2004 | Kim |
| 2004/0203820 A1 | 10/2004 | Billhartz |
| 2004/0205332 A1 | 10/2004 | Bouchard et al. |
| 2004/0243571 A1 | 12/2004 | Judd |
| 2004/0250027 A1 | 12/2004 | Heflinger |
| 2004/0255048 A1 | 12/2004 | Lev Ran et al. |
| 2005/0010653 A1 | 1/2005 | McCanne |
| 2005/0044270 A1 | 2/2005 | Grove et al. |
| 2005/0053094 A1 | 3/2005 | Cain et al. |
| 2005/0055372 A1 | 3/2005 | Springer, Jr. et al. |
| 2005/0055399 A1 | 3/2005 | Savchuk |
| 2005/0071453 A1 | 3/2005 | Ellis et al. |
| 2005/0091234 A1 | 4/2005 | Hsu et al. |
| 2005/0111460 A1 | 5/2005 | Sahita |
| 2005/0131939 A1 | 6/2005 | Douglis et al. |
| 2005/0132252 A1 | 6/2005 | Fifer et al. |
| 2005/0141425 A1 | 6/2005 | Foulds |
| 2005/0171937 A1 | 8/2005 | Hughes et al. |
| 2005/0177603 A1 | 8/2005 | Shavit |
| 2005/0190694 A1 | 9/2005 | Ben-Nun et al. |
| 2005/0207443 A1 | 9/2005 | Kawamura et al. |
| 2005/0210151 A1 | 9/2005 | Abdo et al. |
| 2005/0220019 A1 | 10/2005 | Melpignano |
| 2005/0220097 A1 | 10/2005 | Swami et al. |
| 2005/0235119 A1 | 10/2005 | Sechrest et al. |
| 2005/0240380 A1 | 10/2005 | Jones |
| 2005/0243743 A1 | 11/2005 | Kimura |
| 2005/0243835 A1 | 11/2005 | Sharma et al. |
| 2005/0256972 A1 | 11/2005 | Cochran et al. |
| 2005/0278459 A1 | 12/2005 | Boucher et al. |
| 2005/0283355 A1 | 12/2005 | Itani et al. |
| 2005/0286526 A1 | 12/2005 | Sood et al. |
| 2006/0013210 A1 | 1/2006 | Bordogna et al. |
| 2006/0026425 A1 | 2/2006 | Douceur et al. |
| 2006/0031936 A1 | 2/2006 | Nelson et al. |
| 2006/0036901 A1 | 2/2006 | Yang et al. |
| 2006/0039354 A1 | 2/2006 | Rao et al. |
| 2006/0045096 A1 | 3/2006 | Farmer et al. |
| 2006/0059171 A1 | 3/2006 | Borthakur et al. |
| 2006/0059173 A1 | 3/2006 | Hirsch et al. |
| 2006/0117385 A1 | 6/2006 | Mester et al. |
| 2006/0136913 A1 | 6/2006 | Sameske |
| 2006/0143497 A1 | 6/2006 | Zohar et al. |
| 2006/0195547 A1 | 8/2006 | Sundarrajan et al. |
| 2006/0195840 A1 | 8/2006 | Sundarrajan et al. |
| 2006/0212426 A1 | 9/2006 | Shakara et al. |
| 2006/0218390 A1 | 9/2006 | Loughran et al. |
| 2006/0227717 A1 | 10/2006 | van den Berg et al. |
| 2006/0250965 A1 | 11/2006 | Irwin |
| 2006/0268932 A1 | 11/2006 | Singh et al. |
| 2006/0280205 A1 | 12/2006 | Cho |
| 2007/0002804 A1 | 1/2007 | Xiong et al. |
| 2007/0008884 A1 | 1/2007 | Tang |
| 2007/0011424 A1 | 1/2007 | Sharma et al. |
| 2007/0038815 A1 | 2/2007 | Hughes |
| 2007/0038816 A1 | 2/2007 | Hughes et al. |
| 2007/0038858 A1 | 2/2007 | Hughes |
| 2007/0050475 A1 | 3/2007 | Hughes |
| 2007/0076693 A1 | 4/2007 | Krishnaswamy |
| 2007/0081513 A1 | 4/2007 | Torsner |
| 2007/0097874 A1 | 5/2007 | Hughes et al. |
| 2007/0110046 A1 | 5/2007 | Farrell et al. |
| 2007/0115812 A1 | 5/2007 | Hughes |
| 2007/0127372 A1 | 6/2007 | Khan et al. |
| 2007/0130114 A1 | 6/2007 | Li et al. |
| 2007/0140129 A1 | 6/2007 | Bauer et al. |
| 2007/0150497 A1 | 6/2007 | De La Cruz et al. |
| 2007/0174428 A1 | 7/2007 | Lev Ran et al. |
| 2007/0179900 A1 | 8/2007 | Daase et al. |
| 2007/0195702 A1 | 8/2007 | Yuen et al. |
| 2007/0195789 A1 | 8/2007 | Yao |
| 2007/0198523 A1 | 8/2007 | Hayim |
| 2007/0226320 A1 | 9/2007 | Hager et al. |
| 2007/0237104 A1 | 10/2007 | Alon et al. |
| 2007/0244987 A1 | 10/2007 | Pedersen et al. |
| 2007/0245079 A1 | 10/2007 | Bhattacharjee et al. |
| 2007/0248084 A1 | 10/2007 | Whitehead |
| 2007/0258468 A1 | 11/2007 | Bennett |
| 2007/0263554 A1 | 11/2007 | Finn |

(56) References Cited

U.S. PATENT DOCUMENTS

| | | |
|---|---|---|
| 2007/0276983 A1 | 11/2007 | Zohar et al. |
| 2007/0280245 A1 | 12/2007 | Rosberg |
| 2008/0005156 A1 | 1/2008 | Edwards et al. |
| 2008/0013532 A1 | 1/2008 | Garner et al. |
| 2008/0016301 A1 | 1/2008 | Chen |
| 2008/0028467 A1 | 1/2008 | Kommareddy et al. |
| 2008/0031149 A1 | 2/2008 | Hughes et al. |
| 2008/0031240 A1 | 2/2008 | Hughes et al. |
| 2008/0071818 A1 | 3/2008 | Apanowicz et al. |
| 2008/0095060 A1 | 4/2008 | Yao |
| 2008/0133536 A1 | 6/2008 | Bjorner et al. |
| 2008/0133561 A1 | 6/2008 | Dubnicki et al. |
| 2008/0184081 A1 | 7/2008 | Hama et al. |
| 2008/0205445 A1 | 8/2008 | Kumar et al. |
| 2008/0222044 A1 | 9/2008 | Gottlieb et al. |
| 2008/0229137 A1 | 9/2008 | Samuels et al. |
| 2008/0243992 A1 | 10/2008 | Jardetzky et al. |
| 2008/0267217 A1 | 10/2008 | Colville et al. |
| 2008/0300887 A1 | 12/2008 | Chen et al. |
| 2008/0313318 A1 | 12/2008 | Vermeulen et al. |
| 2008/0320151 A1 | 12/2008 | McCanne et al. |
| 2009/0006801 A1 | 1/2009 | Shultz et al. |
| 2009/0024763 A1 | 1/2009 | Stepin et al. |
| 2009/0037448 A1 | 2/2009 | Thomas |
| 2009/0060198 A1 | 3/2009 | Little |
| 2009/0063696 A1 | 3/2009 | Wang et al. |
| 2009/0080460 A1 | 3/2009 | Kronewitter, III et al. |
| 2009/0089048 A1 | 4/2009 | Pouzin |
| 2009/0092137 A1* | 4/2009 | Haigh et al. ............... 370/392 |
| 2009/0100483 A1 | 4/2009 | McDowell |
| 2009/0158417 A1 | 6/2009 | Khanna et al. |
| 2009/0175172 A1 | 7/2009 | Prytz et al. |
| 2009/0204961 A1* | 8/2009 | DeHaan ............... G06F 8/60 718/1 |
| 2009/0234966 A1 | 9/2009 | Samuels et al. |
| 2009/0245114 A1 | 10/2009 | Vijayaraghavan |
| 2009/0265707 A1 | 10/2009 | Goodman et al. |
| 2009/0274294 A1 | 11/2009 | Itani |
| 2009/0279550 A1 | 11/2009 | Romrell et al. |
| 2009/0281984 A1 | 11/2009 | Black |
| 2010/0005222 A1 | 1/2010 | Brant et al. |
| 2010/0011125 A1 | 1/2010 | Yang et al. |
| 2010/0020693 A1 | 1/2010 | Thakur |
| 2010/0054142 A1 | 3/2010 | Moiso et al. |
| 2010/0070605 A1 | 3/2010 | Hughes et al. |
| 2010/0077251 A1 | 3/2010 | Liu et al. |
| 2010/0082545 A1 | 4/2010 | Bhattacharjee et al. |
| 2010/0085964 A1 | 4/2010 | Weir et al. |
| 2010/0115137 A1 | 5/2010 | Kim et al. |
| 2010/0121957 A1 | 5/2010 | Roy et al. |
| 2010/0124239 A1 | 5/2010 | Hughes |
| 2010/0131957 A1 | 5/2010 | Kami |
| 2010/0169467 A1* | 7/2010 | Shukla ............... H04L 49/70 709/220 |
| 2010/0177663 A1 | 7/2010 | Johansson et al. |
| 2010/0225658 A1 | 9/2010 | Coleman |
| 2010/0232443 A1* | 9/2010 | Pandey ............... H04L 49/10 370/401 |
| 2010/0242106 A1 | 9/2010 | Harris et al. |
| 2010/0246584 A1 | 9/2010 | Ferguson et al. |
| 2010/0290364 A1 | 11/2010 | Black |
| 2010/0318892 A1 | 12/2010 | Teevan et al. |
| 2010/0333212 A1 | 12/2010 | Carpenter et al. |
| 2011/0002346 A1* | 1/2011 | Wu ............... 370/474 |
| 2011/0022812 A1* | 1/2011 | van der Linden et al. ... 711/163 |
| 2011/0113472 A1* | 5/2011 | Fung et al. ............... 726/3 |
| 2011/0154169 A1 | 6/2011 | Gopal et al. |
| 2011/0154329 A1 | 6/2011 | Arcese et al. |
| 2011/0181448 A1 | 7/2011 | Koratagere |
| 2011/0219181 A1 | 9/2011 | Hughes et al. |
| 2011/0225322 A1 | 9/2011 | Demidov et al. |
| 2011/0258049 A1 | 10/2011 | Ramer et al. |
| 2011/0261828 A1* | 10/2011 | Smith ............... H04L 12/462 370/401 |
| 2011/0276963 A1* | 11/2011 | Wu et al. ............... 718/1 |
| 2011/0299537 A1* | 12/2011 | Saraiya et al. ............... 370/392 |
| 2012/0036325 A1 | 2/2012 | Mashtizadeh et al. |
| 2012/0069131 A1 | 3/2012 | Abelow |
| 2012/0173759 A1* | 7/2012 | Agarwal et al. ............... 709/241 |
| 2012/0218130 A1 | 8/2012 | Boettcher et al. |
| 2012/0221611 A1 | 8/2012 | Watanabe et al. |
| 2012/0230345 A1 | 9/2012 | Ovsiannikov |
| 2012/0239872 A1 | 9/2012 | Hughes et al. |
| 2013/0018722 A1 | 1/2013 | Libby |
| 2013/0018765 A1 | 1/2013 | Fork et al. |
| 2013/0031642 A1 | 1/2013 | Dwivedi et al. |
| 2013/0044751 A1* | 2/2013 | Casado et al. ............... 370/392 |
| 2013/0058354 A1* | 3/2013 | Casado ............... H04L 12/4633 370/401 |
| 2013/0080619 A1 | 3/2013 | Assuncao et al. |
| 2013/0086236 A1 | 4/2013 | Baucke et al. |
| 2013/0094501 A1 | 4/2013 | Hughes |
| 2013/0103655 A1 | 4/2013 | Fanghaenel et al. |
| 2013/0117494 A1 | 5/2013 | Hughes et al. |
| 2013/0121209 A1* | 5/2013 | Padmanabhan et al. ..... 370/255 |
| 2013/0141259 A1 | 6/2013 | Hazarika et al. |
| 2013/0163594 A1 | 6/2013 | Sharma et al. |
| 2013/0250951 A1* | 9/2013 | Koganti ............... 370/390 |
| 2013/0263125 A1* | 10/2013 | Shamsee et al. ............... 718/1 |
| 2013/0282970 A1 | 10/2013 | Hughes et al. |
| 2013/0343191 A1* | 12/2013 | Kim et al. ............... 370/235 |
| 2014/0052864 A1* | 2/2014 | Van Der Linden et al. . 709/226 |
| 2014/0075554 A1 | 3/2014 | Cooley |
| 2014/0101426 A1 | 4/2014 | Senthurpandi |
| 2014/0108360 A1 | 4/2014 | Kunath et al. |
| 2014/0114742 A1 | 4/2014 | Lamontagne et al. |
| 2014/0123213 A1* | 5/2014 | Vank et al. ............... 726/1 |
| 2014/0181381 A1 | 6/2014 | Hughes et al. |
| 2014/0269705 A1 | 9/2014 | DeCusatis et al. |
| 2014/0279078 A1 | 9/2014 | Nukala et al. |
| 2014/0379937 A1 | 12/2014 | Hughes et al. |
| 2015/0074291 A1 | 3/2015 | Hughes |
| 2015/0074361 A1 | 3/2015 | Hughes et al. |
| 2015/0078397 A1 | 3/2015 | Hughes et al. |
| 2015/0120663 A1 | 4/2015 | Le Scouarnec et al. |
| 2015/0170221 A1 | 6/2015 | Shah |
| 2015/0281099 A1 | 10/2015 | Banavalikar |
| 2015/0281391 A1 | 10/2015 | Hughes et al. |
| 2015/0334210 A1 | 11/2015 | Hughes |
| 2016/0014051 A1 | 1/2016 | Hughes et al. |
| 2016/0034305 A1 | 2/2016 | Shear et al. |
| 2016/0093193 A1 | 3/2016 | Silvers et al. |
| 2016/0218947 A1 | 7/2016 | Hughes et al. |
| 2016/0255542 A1 | 9/2016 | Hughes et al. |
| 2017/0111692 A1 | 4/2017 | An et al. |

OTHER PUBLICATIONS

"IPsec Anti-Replay Window: Expanding and Disabling," Cisco IOS Security Configuration Guide. 2005-2006 Cisco Systems, Inc. Last updated: Sep. 12, 2006, 14pages (Previously cited as: Zhao et al.; "Analysis and Improvement on IPSEC Anti-Replay Window Protocol"; 2003; IEEE" pp. 553-558).

Singh et al. ; "Future of Internet Security—IPSEC"; 2005; pp. 1-8.

Muthitacharoen, Athicha et al., "A Low-bandwidth Network File System," 2001, in Proc. of the 18th ACM Symposium on Operating Systems Principles, Banff, Canada, pp. 174-187.

"Shared LAN Cache Datasheet", 1996, http://www.lancache.com/slcdata.htm.

Spring et al., "A protocol-independent technique for eliminating redundant network traffic", ACM SIGCOMM Computer Communication Review, vol. 30, Issue 4 (Oct. 2000) pp. 87-95, Year of Publication: 2000.

Hong, B et al. "Duplicate data elimination in a SAN file system", In Proceedings of the 21st Symposium on Mass Storage Systems (MSS '04), Goddard, MD, Apr. 2004. IEEE.

You, L. L. and Karamanolis, C. 2004. "Evaluation of efficient archival storage techniques", In Proceedings of the 21st IEEE Symposium on Mass Storage Systems and Technologies (MSST).

Douglis, F. et al., "Application specific Delta-encoding via Resemblance Detection", Published in the 2003 USENIX Annual Technical Conference.

(56) References Cited

OTHER PUBLICATIONS

You, L. L. et al., "Deep Store an Archival Storage System Architecture" Data Engineering, 2005. ICDE 2005. Proceedings of the 21st. Intl. Conf. on Data Eng., Tokyo, Japan, Apr. 5-8, 2005, pp. 12.
Manber, Udi, "Finding Similar Files in a Large File System", TR 93-33 Oct. 1994, Department of Computer Science, University of Arizona. http://webglimpse.net/pubs/TR93-33.pdf. Also appears in the 1994 winter USENIX Technical Conference.
Silver Peak Systems, "The Benefits of Byte-level WAN Deduplication" (2008).
Definition memory (n), Webster'S Third New International Dictionary, Unabridged (1993), available at <http://lionreference.chadwyck.com> (Dictionaries/Webster's Dictionary). Copy not provided in proceedings.
Definition appliance, 2c, Webster'S Third New International Dictionary, Unabridged (1993), available at <http://lionreference.chadwyck.com> (Dictionaries/Webster's Dictionary). Copy not provided in proceedings.
Newton, "Newton's Telecom Dictionary", 17th Ed., 2001, pp. 38, 201, and 714.
Advisory Action, Mar. 5, 2015, U.S. Appl. No. 13/288,691, filed Nov. 3, 2011.
Non-Final Office Action, Jun. 2, 2015, U.S. Appl. No. 13/288,691, filed Nov. 3, 2011.
Final Office Action, Jan. 11, 2016, U.S. Appl. No. 13/288,691, filed Nov. 3, 2011.
Advisory Action, Mar. 25, 2015, U.S. Appl. No. 13/274,162, filed Oct. 14, 2011.
Notice of Allowance, May 21, 2015, U.S. Appl. No. 13/274,162, filed Oct. 14, 2011.
Notice of Allowance, Mar. 16, 2015, U.S. Appl. No. 14/190,940, filed Feb. 26, 2014.
Non-Final Office Action, Jun. 8, 2015, U.S. Appl. No. 14/248,167, filed Apr. 8, 2014.
Corrected Notice of Allowability, Aug. 5, 2015, U.S. Appl. No. 14/248,188, filed Apr. 8, 2014.
Notice of Allowance, Jun. 3, 2015, U.S. Appl. No. 14/548,195, filed Nov. 19, 2014.
Non-Final Office Action, Mar. 11, 2015, U.S. Appl. No. 14/549,425, filed Nov. 20, 2014.
Notice of Allowance, Jul. 27, 2015, U.S. Appl. No. 14/549,425, filed Nov. 20, 2014.
Non-Final Office Action, May 6, 2015, U.S. Appl. No. 14/477,804, filed Sep. 4, 2014.
Final Office Action, Sep. 18, 2015, U.S. Appl. No. 14/477,804, filed Sep. 4, 2014.
Non-Final Office Action, May 18, 2015, U.S. Appl. No. 14/679,965, filed Apr. 6, 2015.
Final Office Action, Dec. 21, 2015, U.S. Appl. No. 14/679,965, filed Apr. 6, 2015.
Non-Final Office Action, Jul. 15, 2015, U.S. Appl. No. 14/734,949, filed Jun. 9, 2015.
Non-Final Office Action, Aug. 11, 2015, U.S. Appl. No. 14/677,841, filed Apr. 2, 2015.
Non-Final Office Action, Aug. 18, 2015, U.S. Appl. No. 14/543,781, filed Nov. 17, 2014.
Notice of Allowance, Oct. 5, 2015, U.S. Appl. No. 14/734,949, filed Jun. 9, 2015.
Non-Final Office Action, Dec. 15, 2015, U.S. Appl. No. 14/479,131, filed Sep. 5, 2014
Non-Final Office Action, Dec. 16, 2015. U.S. Appl. No. 14/859,179, filed Sep. 18, 2015.
Non-Final Office Action, Jan. 12, 2016, U.S. Appl. No. 14/477,804, filed Sep. 4, 2014.
Notice of Allowance, Feb. 8, 2016, U.S. Appl. No. 14/543,781, Nov. 17, 2014.
Final Written Decision, Jun. 9, 2015, Inter Partes Review Case No. IPR2014-00245.
"Business Wire, ""Silver Peak Systems Delivers Family of Appliances for Enterprise-Wide Centralization of Branch Office Infrastructure; Innovative Local Instance Networking Approach Overcomes Traditional Application Acceleration Pitfalls" (available at http://www.businesswire.com/news/home/20050919005450/en/Silver-Peak-Systems-Delivers-Family-Appliances-Enterprise-Wide#.UVzkPk7u-1 (last visited Aug. 8, 2014)).
Riverbed, "Riverbed Introduces Market-Leading WDS Solutions for Disaster Recovery and Business Application Acceleration" (available at http://www.riverbed.com/about/news-articles/pressreleases/riverbed-introduces-market-leading-wds-solutions-fordisaster-recovery-and-business-application-acceleration.html (last visited Aug. 8, 2014)).
Tseng, Josh, "When accelerating secure traffic is not secure" (available at http://www.riverbed.com/blogs/whenaccelerati.html?&isSearch=true&pageSize=3&page=2 (last visited Aug. 8, 2014)).
Riverbed, "The Riverbed Optimization System (RiOS) v4.0: A Technical Overview" (explaining "Data Security" through segmentation) (available at http://mediacms.riverbed.com/documents/TechOverview-Riverbed-RiOS_4_0.pdf (last visited Aug. 8, 2014)).
Riverbed, "Riverbed Awarded Patent on Core WDS Technology" (available at: http://www.riverbed.com/about/news-articles/pressreleases/riverbed-awarded-patent-on-core-wds-technology.html (last visited Aug. 8, 2014)).
Final Written Decision, Dec. 30, 2014, Inter Partes Review Case No. IPR2013-00403.
Final Written Decision, Dec. 30, 2014, Inter Partes Review Case No. IPR2013-00402.
Notice of Allowance, Nov. 16, 2016, U.S. Appl. No. 13/288,691, filed Nov. 3, 2011.
Final Office Action, Nov. 21, 2016, U.S. Appl. No. 14/447,505, filed Jul. 30, 2015.
Notice of Allowance, Nov. 23, 2016, U.S. Appl. No. 14/067,619, filed Oct. 30, 2013.
Notice of Allowance, Dec. 5, 2016, U.S. Appl. No. 14/477,804, filed Sep. 4, 2014.
Advisory Action, Jan. 9, 2017, U.S. Appl. No. 15/091,533, filed Apr. 5, 2016.
Corrected Notice of Allowability, Mar. 7, 2016, U.S. Appl. No. 14/543,781, filed Nov. 17, 2014.
Notice of Allowance, Feb. 16, 2016, U.S. Appl. No. 14/248,167, filed Apr. 8, 2014.
Notice of Allowance, Mar. 2, 2016, U.S. Appl. No. 14/677,841, filed Apr. 2, 2015.
Corrected Notice of Allowability, Mar. 14, 2016, U.S. Appl. No. 14/677,841, filed Apr. 2, 2015.
Advisory Action, Mar. 21, 2016, U.S. Appl. No. 14/679,965, filed Apr. 6, 2015.
Non-Final Office Action, May 3, 2016, U.S. Appl. No. 14/679,965, filed Apr. 6, 2015.
Non-Final Office Action, May 6, 2016, U.S. Appl. No. 13/288,691, filed Nov. 3, 2011.
Notice of Allowance, Jun. 3, 2016, U.S. Appl. No. 14/859,179, filed Sep. 18, 2015.
Non-Final Office Action, Jun. 15, 2016, U.S. Appl. No. 15/091,533, filed Apr. 5, 2016.
Non-Final Office Action, Jun. 22, 2016, U.S. Appl. No. 14/447,505, filed Jul. 30, 2014.
Final Office Action, Jul. 19, 2016, U.S. Appl. No. 14/479,131, filed Sep. 5, 2014.
Non-Final Office Action, Jul. 25, 2016, U.S. Appl. No. 14/067,619, filed Oct. 30, 2013.
Final Office Action, Jul. 26, 2016, U.S. Appl. No. 14/477,804, filed Sep. 4, 2014.
Final Office Action, Feb. 17, 2017, U.S. Appl. No. 15/148,933, filed May 6, 2016.
Notice of Allowance, Mar. 23, 2017, U.S. Appl. No. 15/091,533, filed Apr. 5, 2016.
Non-Final Office Action, Apr. 27, 2017, U.S. Appl. No. 14/447,505, filed Jul. 30, 2014.
Final Office Action, May 3, 2017, U.S. Appl. No. 14/479,131, filed Sep. 5, 2014.

(56) References Cited

OTHER PUBLICATIONS

Non-Final Office Action, May 4, 2017, U.S. Appl. No. 14/811,482, filed Jul. 28, 2015.

* cited by examiner

WORKLOAD OPTIMIZATION IN A WIDE AREA NETWORK UTILIZING VIRTUAL SWITCHES

CROSS-REFERENCE TO RELATED APPLICATIONS

This application is related to U.S. patent application Ser. No. 11/240,110 filed Sep. 29, 2005, entitled "Network Memory Appliance for Providing Data Based on Local Accessibility," now U.S. Pat. No. 8,312,226 issued Nov. 13, 2012. This application is also related to U.S. patent application Ser. No. 11/998,726 filed Nov. 30, 2007, entitled "Deferred Data Storage," now U.S. Pat. No. 8,489,562 issued Jul. 16, 2013. The above referenced applications are incorporated herein by reference.

TECHNICAL FIELD

This disclosure relates generally to data optimization within a virtual environment and, more particularly, to workload optimization in a Wide Area Network (WAN) utilizing virtual switches.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Data centers may be used to provide computing infrastructure by employing a number of computing resources and associated components, such as telecommunication equipment, networking equipment, storage systems, backup power supplies, environmental controls, and so forth. A data center may provide a variety of services (e.g., web applications, email services, and search engine services) for a number of customers simultaneously. To provide these services, the computing infrastructure of the data center may run various software applications and store business and operational data. The computing resources distributed throughout the data center may be physical machines and/or virtual machines running on a physical host.

Computing resources of a data center may transmit and receive data packets via a WAN. Physical switches and routers can be distributed throughout the WAN and configured to connect various network segments and route the data packets within the network environment. It may be desirable to optimize or otherwise transform the data packets transmitted and received via the WAN. Routing of the data packets for optimization may be performed by providing instructions to physical switches and routers to reroute the data packets to a data optimization virtual machine. However, involving reconfiguration of physical network components in data optimization may be costly and require complex coordination of various organizations and departments.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In exemplary embodiments, a method may include instructing a virtual switch associated with a virtual machine to redirect one or more data packets directed to or from a first address associated with the virtual machine to a second address associated with a first data optimization virtual machine. The method may further include receiving, at the first data optimization virtual machine, the one or more data packets redirected by the virtual switch. The method may then selectively perform one or more transformations on the one or more data packets to create one or more transformed data packets, and transmit the one or more transformed data packets to a second data optimization virtual machine.

In further embodiments, a system may comprise an optimization controller to provide redirection instructions to a virtual switch associated with a virtual machine. The virtual switch may redirect, based on the redirection instructions, one or more data packets directed to or from a first address associated with the virtual machine to a second address associated with a first data optimization virtual machine. The first data optimization virtual machine may receive the one or more data packets redirected by the virtual switch, selectively perform one or more transformations on the one or more data packets to create one or more transformed data packets, and transmit the one or more transformed data packets to a second data optimization machine.

In further exemplary embodiments, the above method steps may be stored on a machine-readable medium comprising instructions, which when implemented by one or more processors perform the steps of the method. In yet further examples, subsystems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

Figure 1:
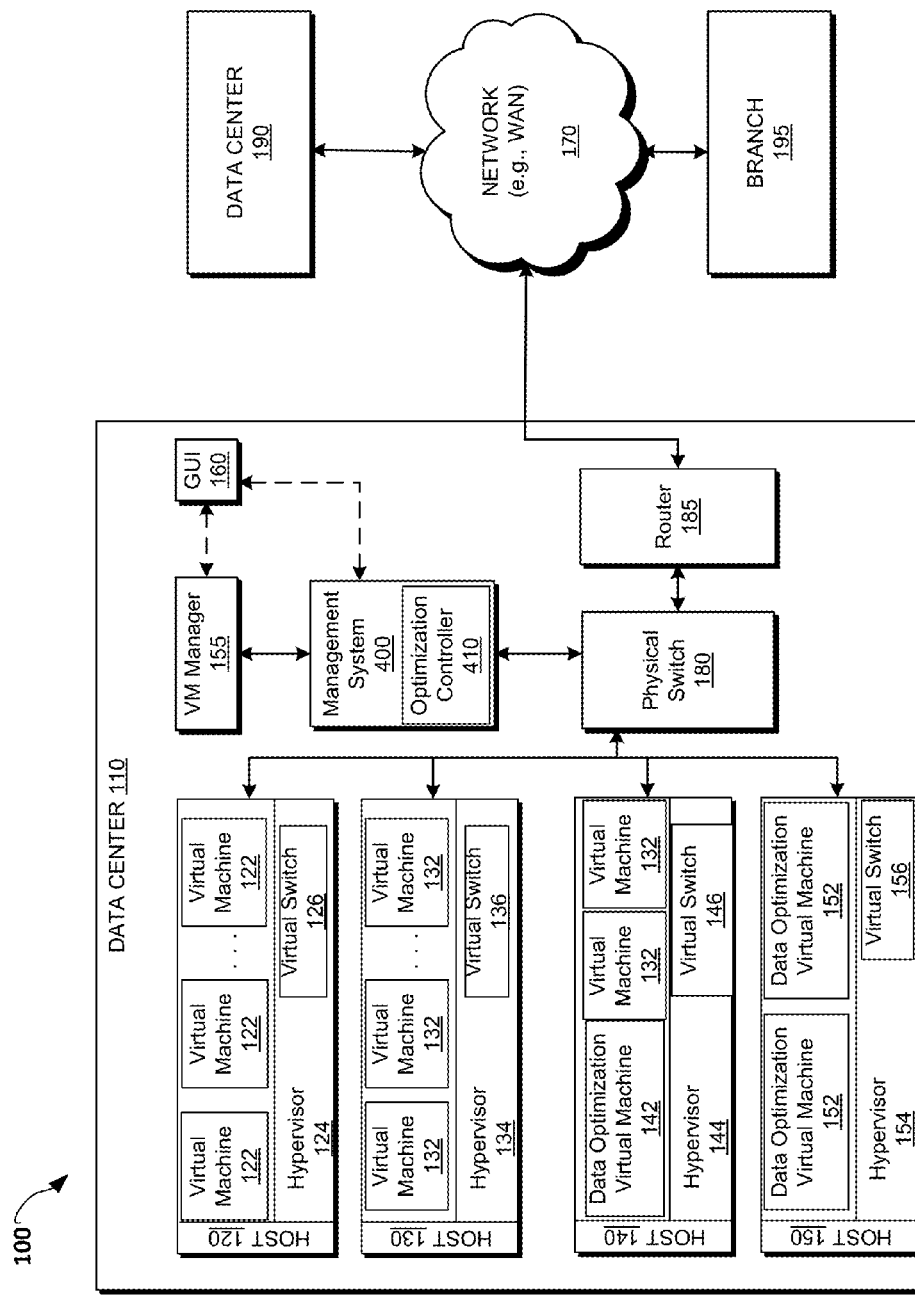
FIG. 1 illustrates an exemplary system environment suitable for implementing data traffic optimization utilizing virtual within a virtual environment.

The following detailed description includes references to the accompanying drawings, which form a part of the detailed description. The drawings show illustrations, in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive, or computer-readable medium.

The embodiments described herein relate to computer-implemented methods for data optimization within a virtual environment. The virtual environment may include a number of virtual machines and virtual switches hosted by one or more hosts, which in turn may reside within a data center. The data optimization may be performed by a data optimization virtual machine. An optimization controller may instruct the virtual switches to redirect outbound data packets to the data optimization virtual machine for further processing. The further processing may include encryption and/or compression of data packets to decrease the transmission and computing costs and/or increase the speed of transmission. The optimized data traffic may be forwarded to one or more other data optimization virtual machines. The data traffic outbound from these other data optimization virtual machines may be transmitted to the original intended destinations via a network such as a WAN.

The data optimization virtual machine may optimize data packets based on a number of criteria. These criteria may include workload or virtual machine names, types of data packets which are to be redirected for optimization, source addresses, destination addresses for transmission of data packets, and so forth. The criteria may also include user instructions which can be provided by the users via a GUI (graphical user interface). The GUI may be integrated within the virtual machine manager as a plug-in.

The GUI may list hosts, software applications, and virtual machines. The list may be constructed automatically by communicating with the virtual machine manager resident in the data center. The users may also select which hosts and/or virtual machines are to be in communication with the data optimization virtual machine. The GUI may be displayed on a desktop, web, or a mobile application and interact with a host such as, for example, a Global Management System host, which provides the users with tools to centrally configure, monitor, and manage data traffic from and to the data center(s). The users may be provided with the ability to specify how the data packets are to be optimized.

The redirecting of data packets by virtual switches may be performed in a variety of ways. In one example, the virtual switches may be provided with one or more access control lists (ACLs) to specify which data packets are to be redirected for optimization. Alternatively, the optimization controller may instruct the virtual machine manager resident in the subject network to automatically perform the workload management function. In addition, the redirecting may be performed in accordance with a command line interface (CLI) protocol, OpenFlow protocol, or any other networking protocols suitable for instructing the virtual machines to redirect the data packets.

The redirecting may involve replacing the destination address of data packets with an address associated with the data optimization virtual machine. Addresses associated with the data optimization virtual machine may also be prepended or appended to the data packets. The destination and/or source addresses may be included in headers of the data packets once the data packets are optimized or otherwise processed by the data optimization virtual machine.

An optimization controller may query the workload manager for a list of all available hosts and virtual machines. The optimization controller may at least in part use that list as a basis to generate a GUI displayed for the user. The system of the present invention may in some exemplary configurations be installed as a plugin in the virtual machine manager.

FIG. 1 shows an exemplary system environment 100 suitable for implementing methods for data traffic optimization within a virtual environment. In particular, this embodiment is related to a data center 110 that may include multiple physical hosts (also known as host servers) 120, 130, 140, and 150. Hosts 120 and 130 may host one or more virtual machines (also known as workloads) 122 and 132, respectively, performing various computational tasks. Hosts 140 and 150 may host one or more data optimization virtual machines 142 and 152 (also known as optimization appliances). It should be appreciated by those skilled in the art that the foregoing virtual machines can be implemented with software emulation, hardware virtualization, or a combination thereof.

As illustrated in FIG. 1 relative to host 140, host 140 may control both multiple virtual machines 132 and the data optimization virtual machine 142. The virtual machines may run any software application on any operating system. The workload names may be derived from the application running on the virtual machine.

The virtual machines 122, 132, 142, and 152 may be provided with dedicated and unique identifiers or addresses such as Internet Protocol (IP) addresses. The virtual machines 122 and 132 may generate data packets, which may include a source address, a destination address, and payload. Hosts 120, 130, 140, 150 may include multiple virtual switches, such as virtual switches 126, 136, 146, and 156.

The hosts 120, 130, 140, and 150 may include hypervisors 124, 134, 144, and 154 respectively. The hypervisors 124, 134, 144, and 154 may utilize hardware or software virtualization techniques allowing multiple guest operating systems to run concurrently on the hosting hosts. The hypervisors 124, 134, 144, and 154 may provide a virtual operating platform and manage execution of the guest operating systems. Multiple instances of a variety of operating systems may share the virtualized hardware resources. Hypervisors can be installed on host hardware and run guest operating systems, which, in turn, may function as hosts for various applications.

The hypervisors 124, 134, 144, and 154 may include virtual switches 126, 136, 146, and 156, respectively. Generally speaking, the virtual switches 126, 136, 146, and 156 may be embodied as software programs, one function of which is to allow one virtual machine to communicate with another virtual machine. Just like their physical counterparts (for example, Ethernet switches), virtual switches may not only forward data packets, but may also intelligently direct communications of a network by inspecting data packets before passing them on. The virtual switches 126, 136, 146, and 156 may be embedded into virtualization software within hypervisors 124, 134, 144, and 154, or, alternatively, the virtual switches 126, 136, 146, and 156 may be included in the hardware of hosts 120, 130, 140, and 150 as part of their firmware. The virtual switches 126, 136, 146, and 156 may also be installed as a module inside a hypervisor.

The system environment 100 may further include a physical switch 180, which may be configured to receive data packets from multiple sources (e.g., hosts 120, 130, 140, and 150) and then transmit the data packets to the intended networked devices. The physical switch 180 may direct data packets from virtual switches 126, 136, 146, and 156 and/or data optimization virtual machines 142 and 152 to virtual switches and/or data optimization virtual machines outside the data center 110, for example to a second data center 190 or to a branch 195. The data packets may be transmitted via a network 170 using a router 185. The second data center 190 and the branch 195 may include one or more data optimization virtual machines.

The network 170 may include one or more of the following: WAN, the Internet, Metropolitan Area Network (MAN), Backbone network, Storage Area Network (SAN), Advanced Intelligent Network (AIN), Local Area Network (LAN), Personal Area Network (PAN), and so forth.

As mentioned above, hosts 140 and 150 may host one or more data optimization virtual machines 142 and 152 which will be described in greater detail below with reference to FIG. 3. Virtual switches 126, 136, 146, and 156 may be programmed by the optimization controller 410 which may be resident in a management system 400 to redirect inbound and outbound data packets to the data optimization virtual machines 142 and 152 based on certain criteria. Alternatively, the optimization controller 410 may instruct a pre-existing virtual machine manager 155 to program the virtual switches 126, 136, 146, and 156.

The criteria used to program the virtual switches 126, 136, 146 and 156 may include user instructions which can be provided by a user via a GUI 160 facilitated by a GUI interface (plugin), which may also be resident in the management system 400. The GUI interface may reside inside or outside the management system 400.

The optimization controller 410 and the GUI interface may be implemented, for example, with VMware virtualization software (such as vSphere® and vCenter™) plugged into an application server (e.g. websphere). The GUI 160 can be populated from the optimization controller 410 via the GUI interface. The optimization controller 410 can obtain a list of hosts and virtual machines and generate a relational table which can be manipulated by a user from the GUI 160. The user may check or uncheck various options or perform other selections, for example, select a particular data optimization virtual machine to optimize a particular workload. Based on these selections, the optimization controller 410 is responsible for distributing this information to the virtual switches 126, 136, 146 and 156. The optimization controller 410 may choose to send the whole table to every virtual switch within a data center or it could partition the table and send only a part of the table that is relevant to this particular host server.

The data optimization virtual machines 142 and 152 may be configured to receive such redirected data packets and implement optimization algorithms such as encryption and/or compression of payloads. The optimization may also involve transformation of data packet types from one form to another, changes in data packet length, constitution of data, and so forth. The optimization may also include creating new or updating existing headers by incorporating information associated with the performed optimization so that a receiver may perform decompression and/decryption. Those skilled in the art will appreciate that various optimization techniques may be used to improve data transmission over the network 170. Some possible optimization techniques are described in the applications designated as related applications at the beginning of this disclosure.

Even though the optimization controller 410 is shown to program and control various components of the data center 110, it should be understood that it may also control components of other data centers. Additionally, the management system 400 may reside within or outside the data center 110 or any other data center. Additionally, even though a single optimization controller 410 is shown, it will be understood that there may be additional and/or redundant controllers. There could be additional and/or redundant controllers controlling the data center 110 and/or data center 190. However, it is not necessary for optimization controller 410 to control both data center 110 and data center 190. Each data center may be controlled by a different controller.

The GUI 160 may enable one or more users to select one or more workloads to be optimized and provide other optimization parameters. For example, a user may provide load balancing parameters with respect to a particular workload by specifying that more than one data optimization virtual machine may receive data packets from a virtual machine. The optimization controller 410 then may automatically select a less loaded data optimization virtual machine. In some embodiments, if all data optimization virtual machines are busy, a new data optimization virtual machine can be started by the optimization controller 410. Conversely, if there are more data optimization virtual machines active than the current traffic requires, the optimization controller 410 may shut down one or more data optimization virtual machines.

Figure 2:
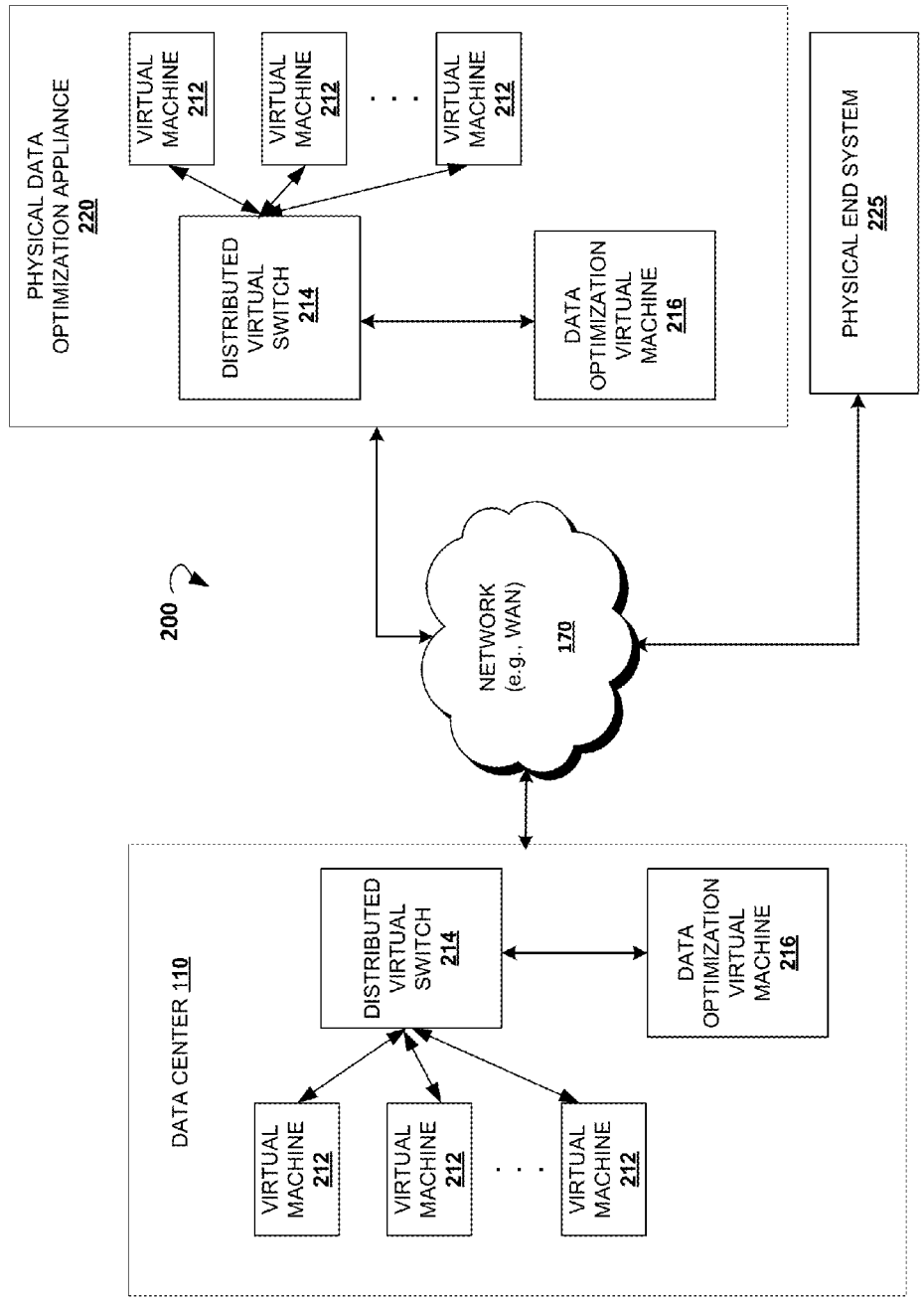
FIG. 2 illustrates a block diagram of a system and process steps for data optimization within a virtual environment utilizing physical data optimization appliances.

FIG. 2 illustrates a block diagram of a system and process steps for data optimization within a virtual environment 200 that may utilize physical data optimization appliances. As shown in FIG. 2, a virtual machine in a data center 110 may run one or more software virtual machines 212, which generate data packets to be sent to any suitable physical or virtual machine. The virtual machines 212 may provide data packets to a corresponding distributed virtual switch 214 (the virtual switches shown in FIG. 1) within the first data center 110. The distributed virtual switch 214 may analyze the data packets to be sent according to instructions previously received from a management system. If it is determined that the data packets need to be optimized, the distributed virtual switch 214 may replace the destination address with a virtual address associated with a data optimization virtual machine 216 and transmit the data packet, via the network 170, to a physical data optimization appliance 220 or to a physical end system 225.

Figure 3:
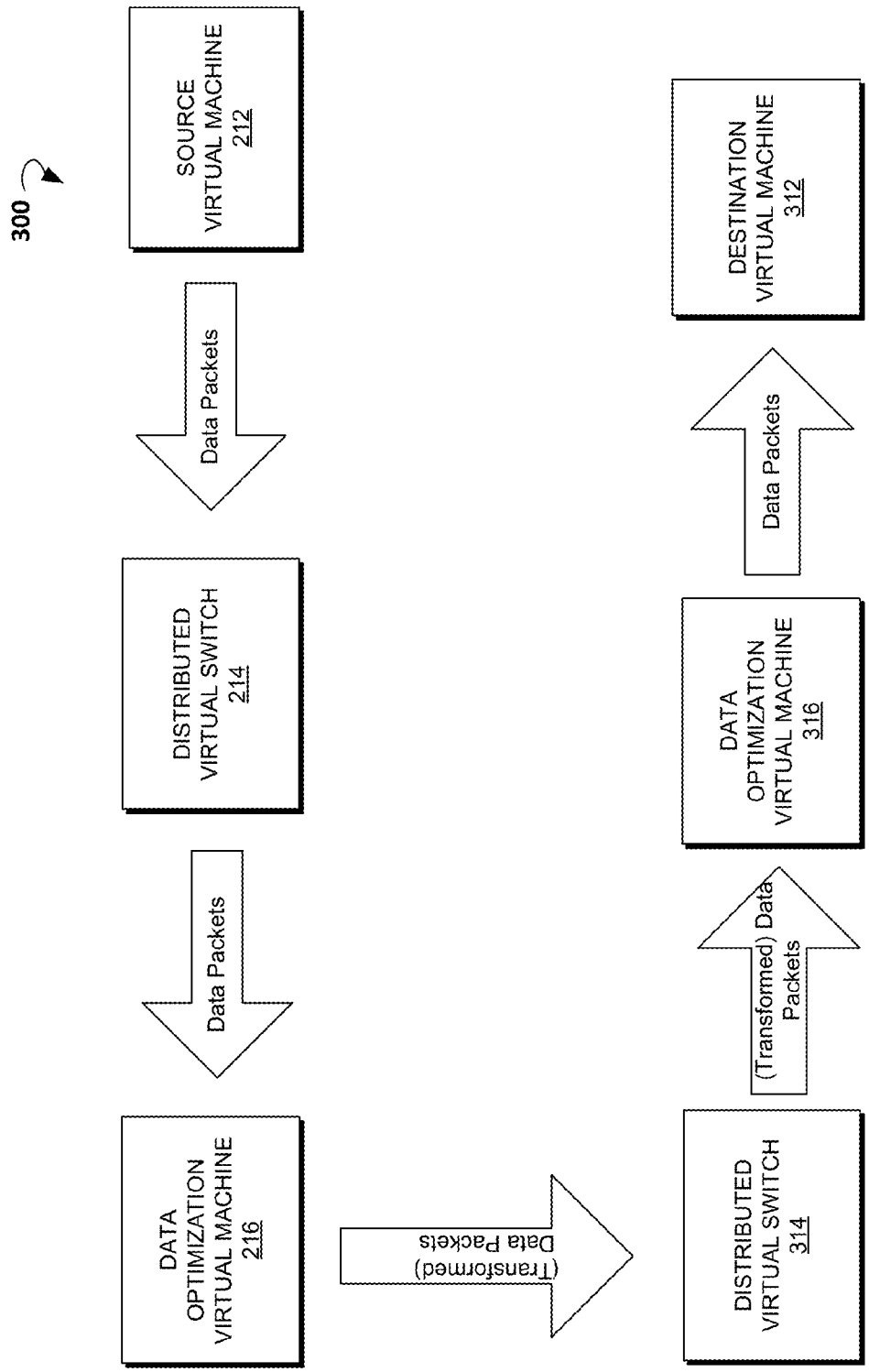
FIG. 3 is process flow diagram illustrating data traffic optimization within a virtual environment.

FIG. 3 is process flow diagram 300 illustrating data traffic optimization within a virtual environment. As shown, a first distributed virtual switch 214 may direct the data packets received from a source virtual machine 212 to a data optimization virtual machine 216 based on an address of the data packets matching an address in an access control list.

The data optimization virtual machine 216 may perform data optimization processes on the data packets (assuming the destination machine has corresponding optimization procedures in place). Data optimization virtual machine 216 may transmit the transformed data packets to a second data optimization virtual machine 316 within another data center optionally via a second distributed virtual switch 314. The data optimization virtual machine 316 may perform transform operations (e.g., unencrypt, decompress) on the data packets and send the transformed data packets to a destination virtual machine 312.

Figure 4:
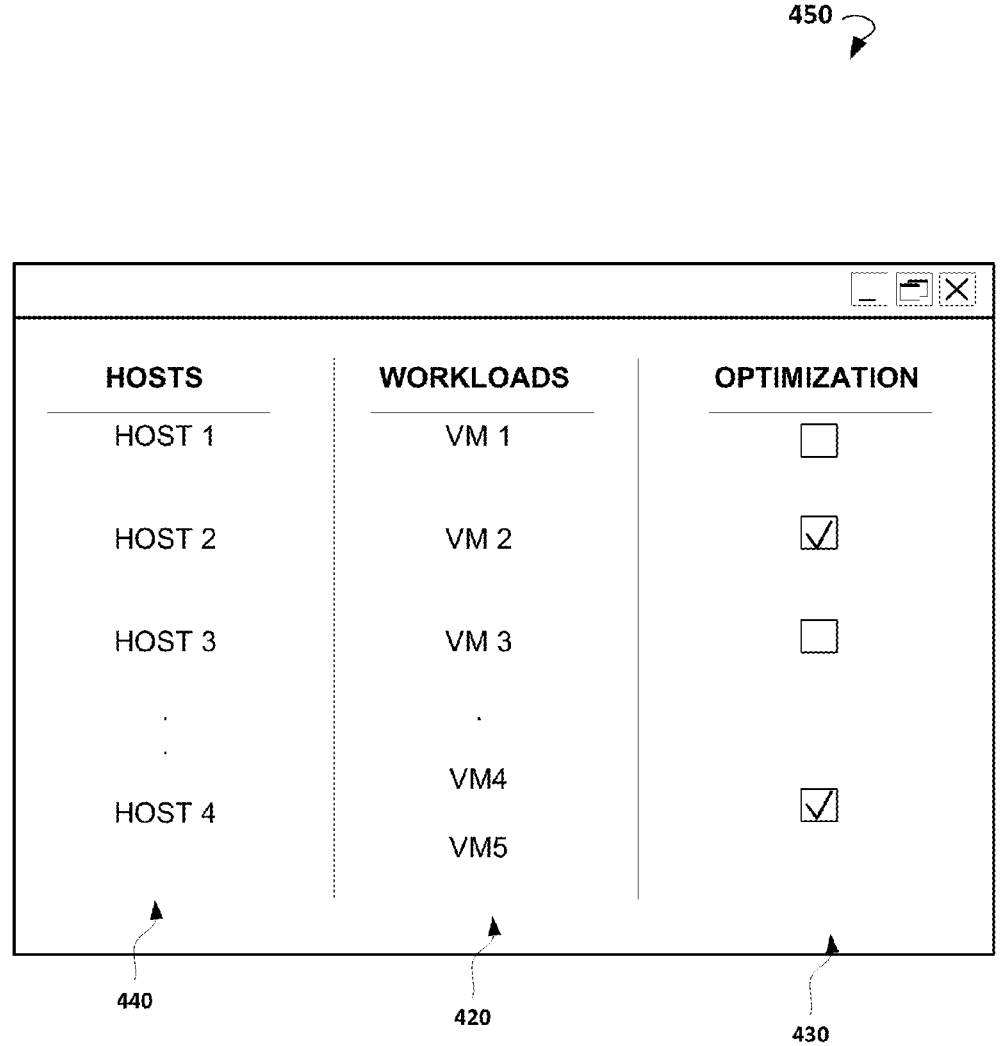
FIG. 4 illustrates a schematic graphical user interface for configuring a data optimization virtual machine.

FIG. 4 illustrates a schematic graphical user interface (GUI) 450 for configuring a data optimization virtual machine. As already mentioned above, virtual data optimization virtual machines may reside at one or more hosts and may comprise multiple software implemented modules. In an embodiment, the data optimization virtual machine may include, embed, or be communicatively coupled to a data optimization virtual machine. The Data Optimization Virtual Machine may further include additional modules, but description of such modules is omitted so as not to burden the reader with excessive details. It will be appreciated by one of ordinary skill in the art that examples of the foregoing modules may be virtual, and instructions to be executed by the modules may in fact be retrieved and executed by a processor.

The data management system may instruct virtual switches to redirect certain data packets to a virtual address associated with the data optimization virtual machine. The instructions to redirect data packets may include one or more criteria including user instructions, types of data packets, and so forth. The data optimization virtual machine may be configured to optimize the data packets to generate one or more optimized data packets. The optimization may include encryption and/or compression of the data packets, their transformation, relations between the data packets, and so forth. The data optimization virtual machine may also be configured to create new or update existing headers to replace the address with the original destination address.

The GUI 450 may be configured to enable users to configure the data optimizing machine, preferences related to data optimization, preferences related to data packet redirecting, and so forth. The settings, instructions, software codes, and other related data may be stored in the storage. The GUI 450 may be shown on a display of a user device (not shown) such as a personal computer (PC), a tablet computer, a mobile device, or any other suitable device. In an example, the GUI 450 may be shown on the display of the user device via a browser or some other software application.

As shown in FIG. 4, the GUI 450 may comprise a list 440 of hosts (e.g., the hosts) and a list 420 of virtual machines (e.g., Oracle, Microsoft Exchange, SAP) hosted by the hosts. There may also be displayed a number of interface utilities such as checkboxes 430 that can be selected by the users to specify which virtual machines or hosts are to be in communication with a data optimization virtual machine. Accordingly, only data packets of the selected virtual machines or hosts may be selected for optimization.

Even though only checkboxes are shown in the optimization table, other selectable items can be provided. Example selectable items are described in more detail with reference to FIG. 5 below. For example, a user may be provided with the ability to select multiple items. As shown in FIG. 4, multiple virtual machines can be deployed on a single host.

Figure 5:
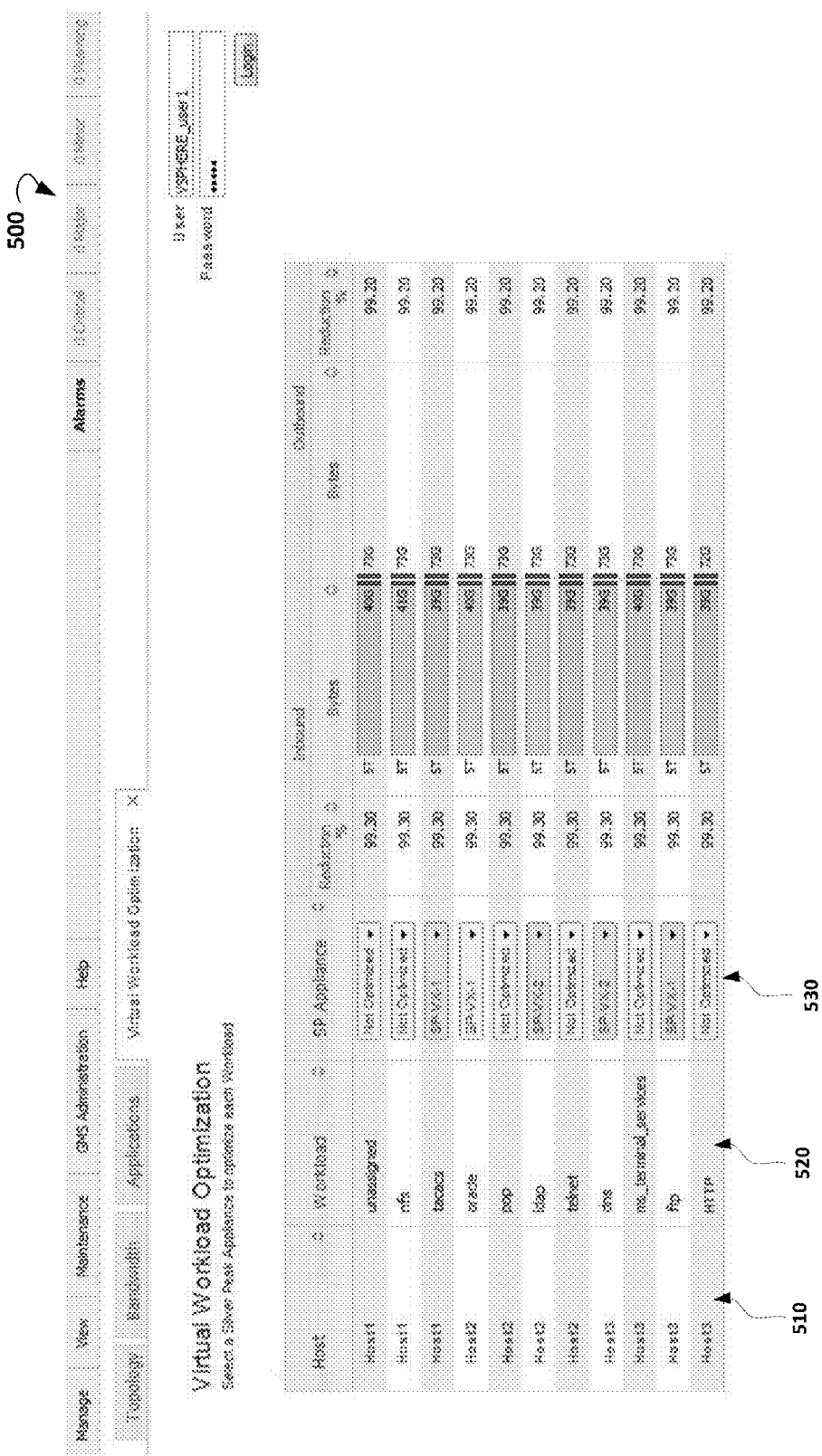
FIG. 5 is a screenshot of a GUI for configuring data optimization virtual machine.

FIG. 5 is a screenshot of a GUI 500 for configuring data optimization virtual machine. As shown, workloads (virtual machines) are associated with certain hosts. Each host may have more than one virtual machine running. For example, host 1 is associated with two workloads "nfs" and "tacacs". A user is able to select a data optimization virtual machine (SP Appliance as shown) to optimize a workload. A single data optimization virtual machine may be assigned multiple workloads for one or more hosts. For example, the "SP-VX-1" data optimization virtual machine is selected to optimize "tacacs" from host 1 and "oracle" from host 2. If no data optimization virtual machine is selected, the data is not optimized. If this is the case, a virtual switch may be instructed to transmit the data packets directly to the destination address. In some embodiments, the virtual switch may transmit the data packets to a data optimization virtual machine but the data optimization virtual machine will not perform any transformations on the data packet and send them on to the destination address. Other parameters can be selected. For example the user can select encryption mode and/or compression levels.

Figure 6:
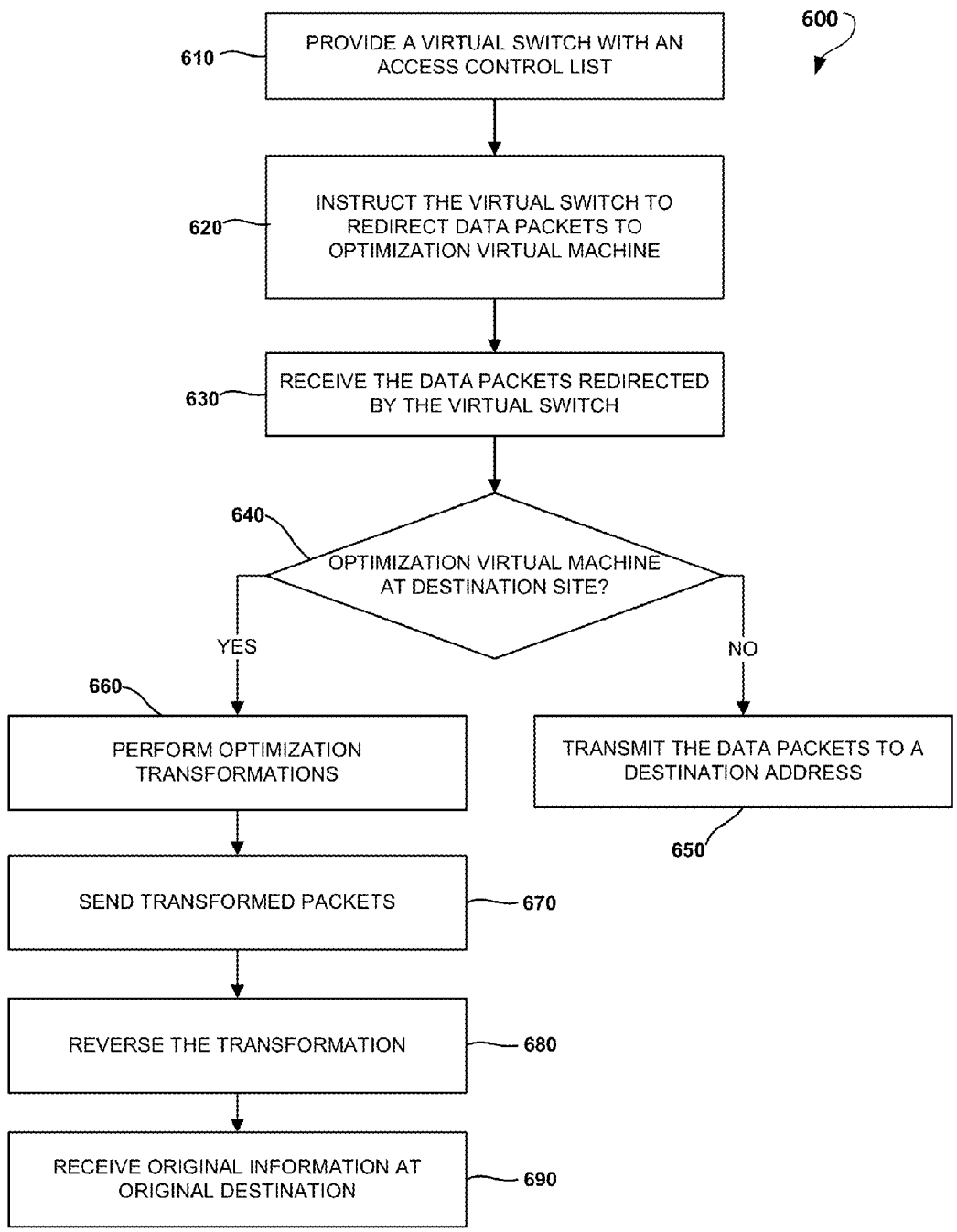
FIG. 6 is a process flow diagram illustrating an exemplary method for data traffic optimization within a virtual environment.

FIG. 6 illustrates an exemplary process flow diagram showing a method 600 for data traffic optimization within a virtual environment. The method 600 may be performed by processing logic that may comprise hardware (e.g., dedicated logic, programmable logic, and microcode), software (such as software run on a general-purpose computer system or a dedicated machine), or a combination of both.

As shown in FIG. 6, the method 600 may commence in operation 610, with the optimization controller 410 providing a virtual switch with an access control list. The optimization controller 410 may then instruct the virtual switch to redirect data packets to optimization appliance in operation 620. The data packets can be then redirected by the virtual switch to an address associated with a data optimization virtual machine. The redirection can be implemented based on a number of criteria and user instructions. These criteria and instructions may specify certain virtual machines, source addresses, destination addresses, payload types, and various other parameters. The redirection of data packets may be performed by replacing the destination address in the header of a data packet with an address associated with a data optimization virtual machine. The original destination address may be, for example, stored somewhere else in the header or payload, or be transmitted to the data optimization virtual machine in a separate communication channel.

In operation 630, the data optimization appliance may receive the data packets redirected by the virtual switch. It may be determined at decision block 640 whether or not there is an optimization virtual machine at the destination site. If it is determined that there is no optimization virtual machine at the destination site, the data optimization appliance may not perform any transformation on the data packets and the data packets are transmitted to the destination address in operation 650.

If on the other hand it is determined that the destination site has one or more corresponding optimization virtual machines, the optimization virtual machine may perform optimization transformations on the data packets in operation 660. The optimization transformations may include encryption, compression, and other transformation facilitating data packet transmission over the network 170. The transformed data packets may then be sent to a second optimization virtual machine in step 670. In step 680, the transformation is reversed. Thereafter, in step 690, the original information is received at the original destination.

Figure 7:
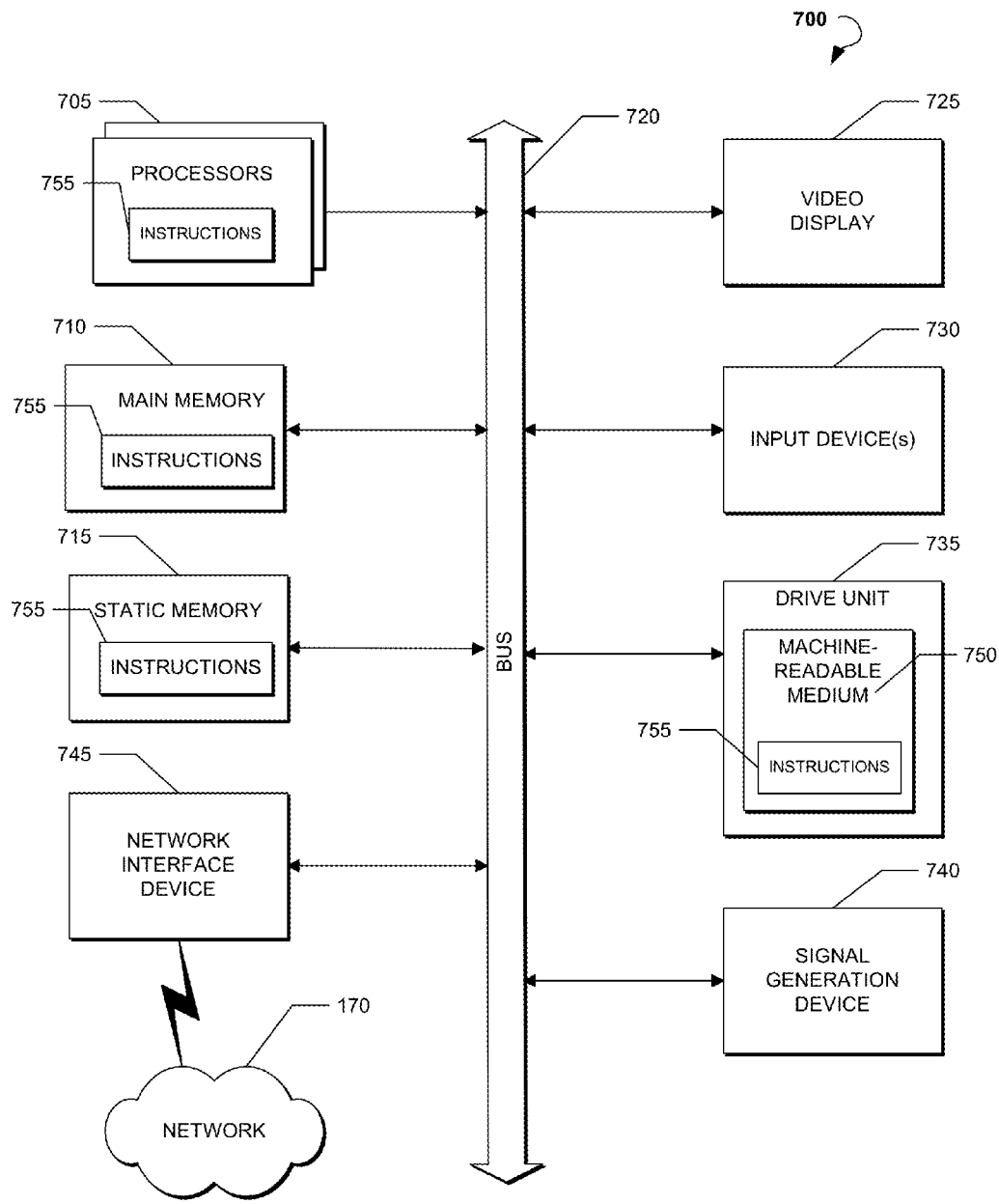
FIG. 7 is a diagrammatic representation of an exemplary machine in the form of a computer system within which a set of instructions for the machine to perform any one or more of the methodologies discussed herein may be executed.

FIG. 7 shows a diagrammatic representation of a computing device for a machine in the example electronic form of a computer system 700, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a host, a client machine in a host-client network environment, or as a peer machine in a peer-to-peer (or distributed) network environment. The machine can be a PC, tablet PC, set-top box (STB), PDA, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 700 includes a processor or multiple processors 705 (e.g., a central processing unit (CPU), a graphics processing unit (GPU) or both), and a main memory 710 and a static memory 715, which communicate with each other via a bus 720. The computer system 700 can further include a video display unit 725 (e.g., a LCD or a cathode ray tube (CRT)). The computer system 700 also includes at least one input device 730, such as an alphanumeric input device (e.g., a keyboard), a cursor control device (e.g., a mouse), a microphone, a digital camera, a video camera, and so forth. The computer system 700 also includes a disk drive unit 735, a signal generation device 740 (e.g., a speaker), and a network interface device 745.

The disk drive unit 735 includes a computer-readable medium 750, which stores one or more sets of instructions and data structures (e.g., instructions 755) embodying or utilized by any one or more of the methodologies or functions described herein. The instructions 755 can also reside, completely or at least partially, within the main memory 710 and/or within the processors 705 during execution thereof by the computer system 700. The main memory 710 and the processors 705 also constitute machine-readable media.

The instructions 755 can further be transmitted or received over the communications network 170 via the network interface device 745 utilizing any one of a number of well-known transfer protocols (e.g., Hyper Text Transfer Protocol (HTTP), CAN, Serial, and Modbus).

While the computer-readable medium 750 is shown in an example embodiment to be a single medium, the term "computer-readable medium" should be taken to include a single medium or multiple media (e.g., a centralized or distributed database, and/or associated caches and hosts) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks (DVDs), random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, methods and systems for data traffic optimization within a virtual environment are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-implemented method for data traffic optimization within a virtual environment, the method comprising:
    retrieving a list of a plurality of virtual machine workloads;
    receiving a selection to optimize data traffic from at least one virtual machine from the retrieved list of the plurality of virtual machine workloads;
    instructing a virtual switch in a hypervisor associated with the selected at least one virtual machine to redirect one or more data packets directed to or from a first address associated with the selected at least one virtual machine to a second address associated with a first data optimization virtual machine;
    receiving, at the first data optimization virtual machine, the one or more data packets redirected by the virtual switch;
    determining whether a second data optimization virtual machine is present at a destination site for the one or more data packets;
    if the second data optimization virtual machine is present at the destination site for the one or more data packets:
        selectively performing, at the first data optimization virtual machine, one or more transformations on the one or more data packets received to create one or more transformed data packets; and
        transmitting the one or more transformed data packets to the second data optimization virtual machine; and
    transmitting the one or more data packets to a destination address if no second data optimization virtual machine is present at the destination site.

2. The method of claim 1, wherein the redirection of the one or more data packets is based at least in part on an access control list.

3. The method of claim 1, wherein the second data optimization virtual machine reconstructs the transformed data packets from the first data optimization virtual machine and forwards them to an original destination.

4. The method of claim 1, wherein the one or more transformations include one or more of encryption, decryption, compression, and decompression.

5. The method of claim 1, wherein the selected at least one virtual machine is a source of the data packets and the first address associated with the selected at least one virtual machine is an original destination address.

6. The method of claim 1, wherein the selected at least one virtual machine is a destination of the data packets and the first address associated with the selected at least one virtual machine is an original source address.

7. The method of claim 1, wherein the one or more transformations of the one or more data packets at the first data optimization virtual machine are based on one or more criteria.

8. The method of claim 1, wherein the one or more data transformations are based on the first address.

9. The method of claim 1, wherein the instructing further includes providing to the first data optimization virtual machine one or more data optimization parameters.

10. The method of claim 1, wherein the redirecting the one or more data packets is performed in accordance with a command line interface protocol.

11. The method of claim 1, wherein the redirecting one or more data packets includes removing the first address from at least one header of the one or more data packets and replacing the first address with the second address.

12. The method of claim 1, wherein the redirecting one or more data packets includes removing the first address from at least one header of the one or more data packets and prepending or appending the second address to the one or more data packets.

13. The method of claim 1, wherein the redirecting one or more data packets includes overriding the first address from at least one header of the one or more data packets by prepending or appending the second address to the headers.

14. A computer system for data traffic optimization within a virtual environment, the system comprising:
an optimization controller to retrieve a list of a plurality of virtual machine workloads, receive a selection to optimize data traffic from at least one virtual machine from the retrieved list of the plurality of virtual machine workloads, and provide redirection instructions to a virtual switch in a hypervisor associated with the selected at least one virtual machine;
the virtual switch to redirect, based on the redirection instructions, one or more data packets directed to or from a first address associated with the selected at least one virtual machine to a second address associated with a first data optimization virtual machine; and
the first data optimization virtual machine to:
receive the one or more data packets redirected by the virtual switch;
selectively perform one or more transformations on the one or more data packets to create one or more transformed data packets if a second data optimization virtual machine is present at a destination site for the one or more data packets;
transmit the one or more transformed data packets to the second data optimization virtual machine if present at the destination site; and
transmit the one or more data packets to a destination address if the second data optimization virtual machine is not present at the destination site.

15. The system of claim 14, wherein the redirection of the one or more data packets is based at least in part on an access control list.

16. The system of claim 14, wherein the second data optimization virtual machine reconstructs the transformed data packets from the first data optimization virtual machine and forwards them to an original destination.

17. The system of claim 14, wherein the first data optimization virtual machine performs at least one of encryption, decryption, compression, and decompression.

18. The system of claim 14, wherein the selected at least one virtual machine is a source of the one or more data packets and the first address associated with the selected at least one virtual machine is an original destination address.

19. The system of claim 14, wherein the selected at least one virtual machine is a destination of the one or more data packets and the first address associated with the selected at least one virtual machine is an original source address.

20. The system of claim 14, wherein the one or more transformations of the one or more data packets at the first data optimization virtual machine are based on one or more criteria.

21. The system of claim 14, wherein the one or more transformations on the one or more data packets to create one or more transformed data packets are based on the first address.

22. The system of claim 14, wherein the optimization controller further provides one or more data optimization parameters to the first data optimization virtual machine.

23. The system of claim 14, wherein the virtual switch redirects the one or more data packets in accordance with a command line interface protocol.

24. The system of claim 14, wherein the redirecting one or more data packets includes removing the first address from headers of the one or more data packets and replacing the first address with the second address.

25. The system of claim 14, wherein the redirecting one or more data packets includes removing the first address from at least one header of the one or more data packets and prepending or appending the second address to the one or more data packets.

26. The system of claim 14, wherein the redirecting one or more data packets includes overriding the first address from at least one header of the one or more data packets by prepending or appending the second address to the headers.

27. A non-transitory processor-readable medium having embodied thereon instructions being executable by at least one processor to perform a method for data traffic optimization within a virtual environment, the method comprising:
retrieve a list of a plurality of virtual machine workloads;
receive a selection to optimize data traffic from at least one virtual machine from the retrieved list of the plurality of virtual machine workloads;
instruct a virtual switch in a hypervisor associated with the selected at least one virtual machine to redirect one or more data packets directed to or from a first address associated with the selected at least one virtual machine to a second address associated with a first data optimization virtual machine;

receive, at the first data optimization virtual machine, the one or more data packets redirected by the virtual switch;

determine whether a second data optimization virtual machine is present at a destination site for the one or more data packets;

if the second data optimization virtual machine is present at the destination site for the one or more data packets:
  selectively perform, at the first data optimization virtual machine, one or more transformations on the one or more data packets to create one or more transformed data packets; and
  transmit the one or more transformed data packets to the second data optimization virtual machine; and transmit the one or more data packets to a destination address if no second data optimization virtual machine is present at the destination site.

\* \* \* \* \*